No. 672,680. Patented Apr. 23, 1901.
N. R. MARSHMAN.
TYPE WRITING MACHINE.
(Application filed May 19, 1900.)
(No Model.)
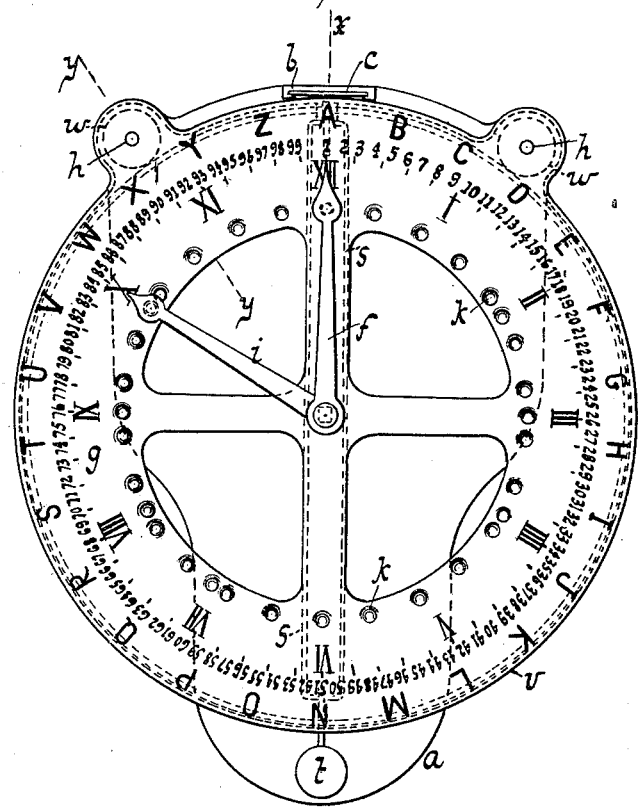
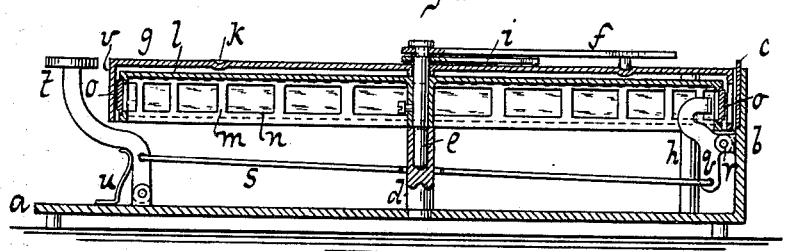
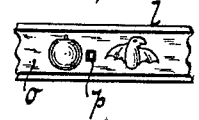 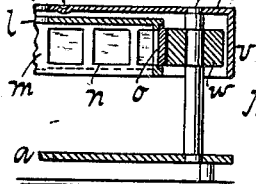
WITNESSES:
William Miller
Chas. E. Bergen
INVENTOR
Newman R. Marshman
BY
Hauff + Hauff
ATTORNEYS

UNITED STATES PATENT OFFICE.

NEWMAN R. MARSHMAN, OF NEW YORK, N. Y.

TYPE-WRITING MACHINE.

SPECIFICATION forming part of Letters Patent No. 672,680, dated April 23, 1901.

Application filed May 19, 1900. Serial No. 17,257. (No model.)

*To all whom it may concern:*

Be it known that I, NEWMAN R. MARSHMAN, a citizen of the United States, residing at Manhattan borough, New York city, in the county and State of New York, have invented new and useful Improvements in Type-Writing Machines, of which the following is a specification.

By means of this invention a type-writing machine can be made of simple and cheap construction. Such machines can be put on the market as so-called "children's" or "kindergarten" machines, although not necessarily confined to such purpose.

The invention resides in the novel features of construction set forth in the following specification and claims, and illustrated in the annexed drawings, in which—

Figure 1 is a plan view of a type-writing machine embodying this invention. Fig. 2 is a section along $x\ x$, Fig. 1. Fig. 3 is a detail view of part of a type-band. Fig. 4 is a section along $y\ y$, Fig. 1.

In the drawings is shown a base $a$ with a rear or platen part $b$. In the construction shown a card or ticket or like small sheet $c$ is to be slipped into the pocket or platen $b$ and when printed on removed for a blank ticket to be slipped in place and printed in its turn. This particular arrangement is adapted to keep a child occupied; but of course in place of a fixed platen a carriage or paper-feeder actuated or propelled by hand or otherwise can be applied to the machine, but forms no part of this invention.

On base $a$ is a post or seat $d$ for the shaft $e$, which can be rotated by pointer $f$. This pointer is detachable from the shaft or keyed or secured thereto by a screw or suitable means, so that the shaft having been passed through the top or indicator plate $g$ the pointer can be applied to the shaft.

The top plate $g$ is fixed or secured in place by fastenings or studs $h$, and in the example shown this top plate is provided with the alphabet, with a dial or clock-face graduations, and with figures or ordinals—say from "1" to "100." In the drawings is also shown a hand or pointer $i$, auxiliary to pointer $f$, and which can be slipped or set around on shaft $e$, and the two pointers $f$ and $i$ can serve for teaching the reading of a clock.

The indicator-plate $g$ has notches or dents $k$, and the pointer $f$ or a stud carried by this pointer is adapted to be held or locked by the dents or depressions, so that clear or steady printing is effected. The pointer $f$ can be given a spring tendency toward the plate $g$, so as to automatically spring or lock itself into a notch when brought to the latter.

On shaft $e$ or rotating therewith is a type wheel or carrier $l$, shown with a rim or flange $m$, which may be of one piece with the body or spokes of the wheel. This rim $m$ has perforations $n$. A rubber or elastic band $o$ is shown stretched or seated about the wheel or rim $m$, the latter having upper and lower projections, so that the type-band $o$ cannot slip up nor down, but will be held in place. The band $o$ can also have a perforation for seating a lug or teat $p$, Fig. 3, on the wheel-rim, so that the band is in proper position or will not slip about on the wheel.

The type-band can be provided with any desired set of letters, characters, or representations—as, for example, objects having some relation, such as alphabetical, to the letters on plate $g$, so that when the pointer $f$ is, say, at letter "A" the type-band is in position to print the representation of an apple on the sheet or card $c$ at the printing-point or when the pointer is at letter "B" a picture of a bat, and so on.

When the type-band is stretched or moved by hammer $q$ striking through a perforation $n$, so that the band is pressed to ticket $c$, an impression or print is made. The hammer can be made in any suitable way. A simple structure is shown in the drawings, where the hammer, inside of the periphery of rim $m$, is in the form of a lever on fulcrum $r$ and connects by link or bail $s$ with finger lever or button $t$. On depressing the finger-button against the action of spring $u$ the hammer is caused to print or to strike through a rim-perforation $n$ to move or stretch a type on the elastic band to the platen or ticket $c$. When released, the spring $u$ returns or retracts the hammer from printing position.

The plate $g$ is shown with a depending flange $v$ extending about the wheel or type $o$ to prevent the fingers of the user or operator coming against or being soiled or inked by the type. The studs or fastenings $h$, securing plate g, can be also used as bearings for inking-wheels w.

The operation is readily understood. Say in the construction shown it is desired to print the picture of a bat on the ticket c. The pointer f is moved to letter "B" on plate g and locks or steadies itself in the corresponding notch k. The picture of a bat on type-band o is now opposite the printing-point or ticket c, and the hammer or button t being struck the band is pressed to the printing-point and a ticket is printed. Say the pointer f is moved to letter "W." The type-band can be made to set or have the picture of a wagon opposite the printing-point, and so on. By taking the pointers f i off shaft e the plate g can be removed and access obtained to the type-carrier for repairing, cleaning, changing type, or for other purposes.

What I claim as new, and desire to secure by Letters Patent, is—

1. A type-writing machine for kindergarten or educational purposes, said machine having an indicator or top plate provided with the alphabet and a series of recesses, a type-wheel having pictorial representations corresponding to the alphabet and a pointer arranged above said top plate and adapted to engage in the said recesses for locking said plate when an impression is made by one of the pictorial representations, substantially as described.

2. A type-writing machine for kindergarten or educational purposes, said machine having an indicator or top plate provided with the alphabet, a type-wheel, and an elastic type-band on the wheel, said band having pictorial representations so arranged that the starting letters of the names of the objects represented correspond to said alphabet, substantially as described.

3. A type-writing machine for kindergarten or educational purposes, said machine having an indicator or top plate provided with the alphabet, a type-wheel and an elastic type-band on the wheel, said band having pictorial representations so arranged that the starting letters of the names of the objects represented correspond to said alphabet, and a teat on the wheel made to engage the band to secure alphabetical relation between said band and indicator-plate, substantially as described.

4. A type-writing machine for kindergarten or educational purposes, said machine being provided with the alphabet and with type of pictorial illustrations or representations corresponding to the alphabet and means for locking the alphabet to prevent rotation thereof when an impression is made from a type, substantially as described.

5. A type-writing machine for kindergarten or educational purposes, said machine being provided with the alphabet, an elastic or stretching type-band, a hammer, a fixed and non-rotary flat pocket for receiving a card, and means for locking the type-band while the hammer strikes or stretches such band to the pocket, substantially as described.

In testimony whereof I have hereunto set my hand in the presence of two subscribing witnesses.

NEWMAN R. MARSHMAN.

Witnesses:
W. C. HAUFF,
E. F. KASTENHUBER.